(12) United States Patent
Kranz et al.

(10) Patent No.: US 7,625,144 B2
(45) Date of Patent: Dec. 1, 2009

(54) INTERCHANGEABLE LENS WITH OPTICALLY READABLE MARKING

(75) Inventors: Gerhard Kranz, Wetzlar (DE); Oliver Zielberg, Wetzlar (DE); Robert Denk, Braunfels (DE); Ulrich Lies, Wetzlar (DE)

(73) Assignee: Leica Camera AG, Solms (DE)

( * ) Notice: Subject to any disclaimer, the term of this patent is extended or adjusted under 35 U.S.C. 154(b) by 333 days.

(21) Appl. No.: 11/653,283

(22) Filed: Jan. 16, 2007

(65) Prior Publication Data

US 2007/0166028 A1 Jul. 19, 2007

(30) Foreign Application Priority Data

Jan. 17, 2006 (EP) .................................. 06000931

(51) Int. Cl.
*G03B 17/00* (2006.01)
(52) U.S. Cl. ....................................... 396/529; 359/827
(58) Field of Classification Search ................. 396/529; 359/827
See application file for complete search history.

(56) References Cited

U.S. PATENT DOCUMENTS

| | | | | |
|---|---|---|---|---|
| 4,364,652 A * | 12/1982 | Iwata et al. | ............... | 396/80 |
| 4,439,029 A * | 3/1984 | Okura et al. | ............... | 396/267 |
| 4,785,338 A * | 11/1988 | Kinoshita et al. | ............... | 257/434 |
| 5,061,952 A | 10/1991 | Ogawa | | |
| 5,122,822 A | 6/1992 | Morisawa et al. | | |
| 5,570,153 A * | 10/1996 | Shono | ............... | 396/531 |
| 5,778,271 A * | 7/1998 | Kawasaki et al. | ............... | 396/532 |
| 6,269,222 B1 | 7/2001 | Hartung | | |
| 6,351,612 B1 * | 2/2002 | Misawa | ............... | 396/287 |
| 2005/0083577 A1 * | 4/2005 | Varaprasad et al. | ............... | 359/604 |
| 2006/0121363 A1 * | 6/2006 | Kwon | ............... | 430/5 |

FOREIGN PATENT DOCUMENTS

| | | | |
|---|---|---|---|
| DE | 34 3 322 A1 | | 4/1986 |
| DE | 34 43 443 A1 | | 5/1986 |
| DE | 196 12 683 A1 | | 10/1996 |
| EP | 1 006 397 B1 | | 6/2000 |
| GB | 2 299 866 A | | 10/1996 |
| WO | WO 2006002974 A2 | * | 1/2006 |

* cited by examiner

*Primary Examiner*—Melissa J Koval
*Assistant Examiner*—Fang-Chi Chang
(74) *Attorney, Agent, or Firm*—Foley & Lardner LLP

(57) ABSTRACT

An interchangeable lens (1) with a locking device (2, 2') for system cameras is described, wherein an orientation marking (4) for mounting the locking device (2, 2') on the camera is provided at the end of the lens housing (3) facing the camera, and the contact surface (6) of the locking device (2, 2') has a latching depression (8) at a distance from the orientation marking (4) counter to the direction (7) of rotation of the locking operation and the contact surface (6) contains at least two, preferably six, surface areas (10) which are situated next to one another in an isolated fashion at a distance from the latching depression (8) counter to the direction (7) of rotation within an angle segment of from 100° to 160°, preferably 110° to 150°, and can be detected individually by optical means.

6 Claims, 2 Drawing Sheets

INTERCHANGEABLE LENS WITH OPTICALLY READABLE MARKING

CROSS-REFERENCE TO RELATED PATENT APPLICATIONS

The right of foreign priority is claimed under 35 U.S.C. § 119(a) based on European Patent Application No. 06 000 931.3 filed Jan. 17, 2006, the entire contents of which, including the specification, drawings, claims and abstract, are incorporated herein by reference.

BACKGROUND OF THE INVENTION

The invention concerns an interchangeable lens.

Interchangeable lenses of this type can be fitted to a system camera, such as a single-lens reflex camera or a metering viewfinder camera, with the aid of a locking device, usually in the form of a bayonet connection. The interchangeable lenses often have electrical loads, such as automatic focus and shutter adjusting mechanisms. For this reason, the bayonet connections have a plurality of electrical contacts, firstly to supply power to the electrical loads and secondly to transmit signals between the lens and camera housing. This multiplicity of electrical contacts, which are frequently arranged closely next to one another, are prone to defects. Undesired electrical connections between contacts which are not supposed to be connected to one another might occur, for example, when fitting a lens to the camera housing. EP 1 006 397 B1 discloses, in order to avoid these problems, the use of optocouplers for contactless optical signal transmission to separate the signal transmission from the power supply. Undesired short-circuits between signal connections and power supply connections of the lens and of the camera housing when the lens is fitted are reliably avoided in this way.

DE 34 38 322 A1 discloses a method for optical transmission of signal data between lens and camera in system cameras. In this case, defined radiation is produced which varies according to at least one mechanical manipulated variable in terms of at least one of its characteristics and is then converted to an electrical signal used to display the manipulated variable and/or to control camera functions. To this end, the camera housing contains means for producing defined radiation, and the lens has complicated optical means on the inside to receive and guide said radiation and also to return it to the camera housing. The lens additionally has means for varying at least one of the characteristics of said radiation according to at least one mechanical manipulated variable. Means for evaluating these variations in the radiation in view of the display of the manipulated variable and/or to control the camera functions are provided in the camera housing. The arrangement requires a large amount of space and many components, and the robustness of the bayonet mount on the lens side is affected by the light-passage openings. Retrofitting of existing lenses is impossible or possible only with considerable effort.

Another apparatus with optical recording of signal data can be found in DE 34 43 443 A1. The movement of lens mount and camera body relative to one another, which inevitably occurs when fitting the lens, is used to be able to record an optically readable scale in the form of a barcode on the camera lens. The barcode can be recorded only when the lens is being fitted. Malfunctions can occur while reading the scale, because the read apparatus always has to be ready to operate during the fitting process itself, but this instant is not known. Recording a barcode of an already fitted lens, for example after the camera is switched on, is not possible.

SUMMARY OF THE INVENTION

The invention is thus based on an object of providing contactless identification of interchangeable lenses in system cameras, which identification can be read simply and reliably in the rest state of the lens, can easily be retrofitted to existing interchangeable lenses and facilitates association with specific lens types of a camera system for maintenance purposes so well.

According to the invention, this object is achieved with an interchangeable lens as discussed herein.

In order to fasten interchangeable lenses on system cameras, they are rotationally aligned with respect to the camera with the aid of an orientation marking and mounted on the bayonet holder of the camera by the contact surface of its locking device. The lens is fitted to the camera using a rotational movement, and a latching lock of the bayonet holder on the camera latches into the latching depression of the lens. This ensures the reproducible rotational alignment of each interchangeable lens of the camera system with respect to the bayonet holder of the camera. The locking devices of interchangeable lenses are usually fastened on the lens tube with the aid of a multiplicity of fastening screws which are distributed on the circumference of the contact surface at a more or less regular spacing. On account of their design, the fastening screws are, however, in different lens types, situated at different positions (relative to the latching depression) on the circumference of the contact surface and disturb the homogeneity of the contact surface. It has proven especially advantageous for the retrofitting capability of existing lenses and in order to ensure the greatest possible compatibility, to provide surface areas on the contact surface of the locking device at a distance from the latching depression, counter to the direction of rotation of the fitting movement, within an angle segment of from 100° to 160°, which surface areas can be detected individually by optical means. Two to six surface areas of this type arranged next to one another within a narrower angle segment range of from 110° to 150° save space and can be detected with particular reliability in a particularly advantageous manner. The surface areas which can be detected individually by optical means can thus, for different lens types, always be located between the fastening screws and, with respect to the camera bayonet, always within the same angle range with respect to the latch lock. In this manner, the surface areas can be associated simply and reliably with camera read devices.

The surface areas are preferably of the same size and equidistant from one another.

One embodiment of the surface areas, which is especially simple and can be detected reliably, is to provide said surface areas with a light-reflective or light-absorbing coating. In this manner, binary coding is possible, and cost-effective and reflex light barriers of simple design can be used for detection. Surface area coatings comprising a light or dark chrome layer offer particularly good detectability and withstand the mechanical stresses during fitting and detaching processes well.

In existing lenses, the detectable surface areas can, in a particularly simple manner, be produced subsequently in the form of a light or dark lacquer layer.

In existing lenses which already have a light and therefore light-reflective contact surface on the locking device, the light-absorbing surface areas can be produced just as easily by baking heating with laser engraving, by chemical etching or sand blasting. There is no need in this case to replace the locking device by a locking device having a coding. Existing lenses can be retrofitted particularly cost-effectively in this manner.

Locking devices can be supplied separately for particularly flexible handling for retrofitting a very wide variety of existing lens types. For flexible production of surface areas which can be detected individually by optical means, said surface areas are in the form of depressions in the contact surface. The production of the depressions by means of laser engraving or milling has proven particularly advantageous for ensuring a homogeneous structure on the surface of the surface areas to be detected. The light chrome layer, which is applied in a concluding process for the protection of the locking devices made predominantly of brass, can advantageously be used for the light-reflective characteristic. In a particularly simple manner, it is then possible to produce the light-absorbing characteristic by introducing a light-absorbing lacquer layer. The light-reflective or light-absorbing characteristic reliably remains, on account of the depressions, even under the heavy loads when fitting and detaching the lens to/from the bayonet holder of the camera.

A further advantage of the invention is to use the surface areas in the contact surface of the locking device for encoding of basic lens data, such as focal length and aperture ratio. It is likewise possible to encode individual data items to be assigned to each individual lens, such as correction values for maintenance purposes.

Further objects, features and advantages of the present invention will become apparent from the detailed description of preferred embodiments that follows, when considered together with the accompanying figures of drawing.

BRIEF DESCRIPTION OF THE DRAWINGS

The invention is described and explained in more detail below with reference to one exemplary embodiment illustrated schematically in the drawing, in which.

DETAILED DESCRIPTION OF THE PREFERRED EMBODIMENTS

Figure 1:
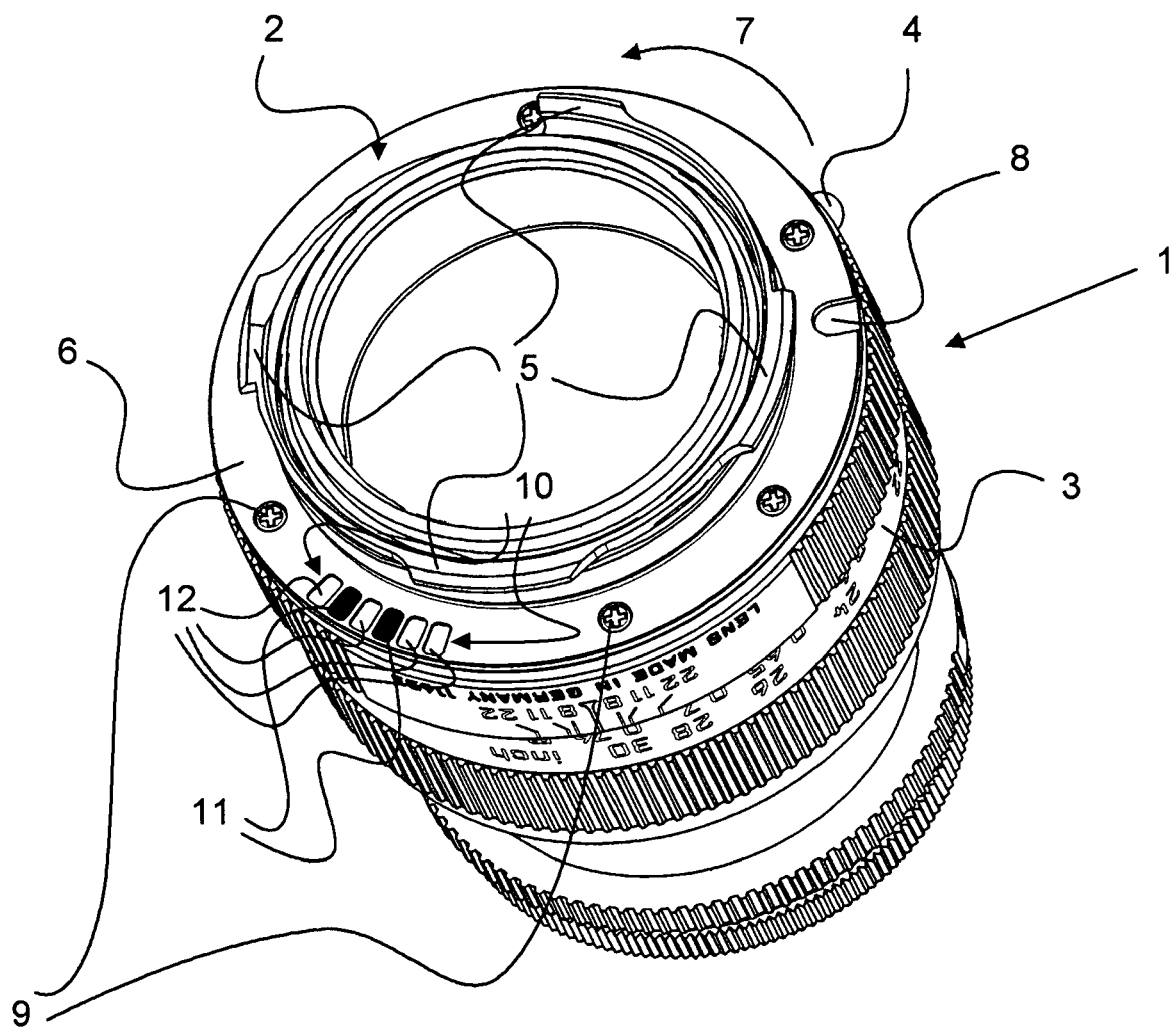
FIG. 1 shows an interchangeable lens with locking device.

The interchangeable lens 1 illustrated in an oblique view in FIG. 1 and having a locking device 2 for a system camera (not illustrated in any more detail) with bayonet holder has an orientation marking 4 at the end of its lens housing 3 facing the camera. In order to mount the locking device 2 on the system camera at the correct rotation angle, said orientation marking 4 is made to match a like corresponding marking on the system camera. When the interchangeable lens 1 is being fitted, four bayonet tabs 5 which are integrally formed on the locking device 2 are guided through corresponding recesses in the bayonet holder of the system camera, until the contact surface 6 of the locking device 2 is in contact with the bayonet holder. Locking is then achieved by rotation of the interchangeable lens 1 in a direction of rotation as illustrated with the aid of an arrow 7, until a latching device on the bayonet holder of the system camera latches into a latching depression 8 in the locking device 2 effects the locking. The latching depression 8 is arranged on the contact surface 6 of the locking device 2 counter to the direction of rotation and at a distance from the orientation marking 4. Six surface areas 10 are further located on the contact surface 6 and are situated next to one another in an isolated fashion at a distance from the latching depression 8 counter to the direction 7 of rotation between two fastening screws 9. Two light-absorbing surface areas 11 are black and four light-reflective surface areas 12 are light in the illustration. The surface areas 10 are situated within an angle segment of preferably from 110° to 150° at a distance from the latching depression 8. The surface areas 10 are each of equal size and equidistant from one another.

Figure 2:
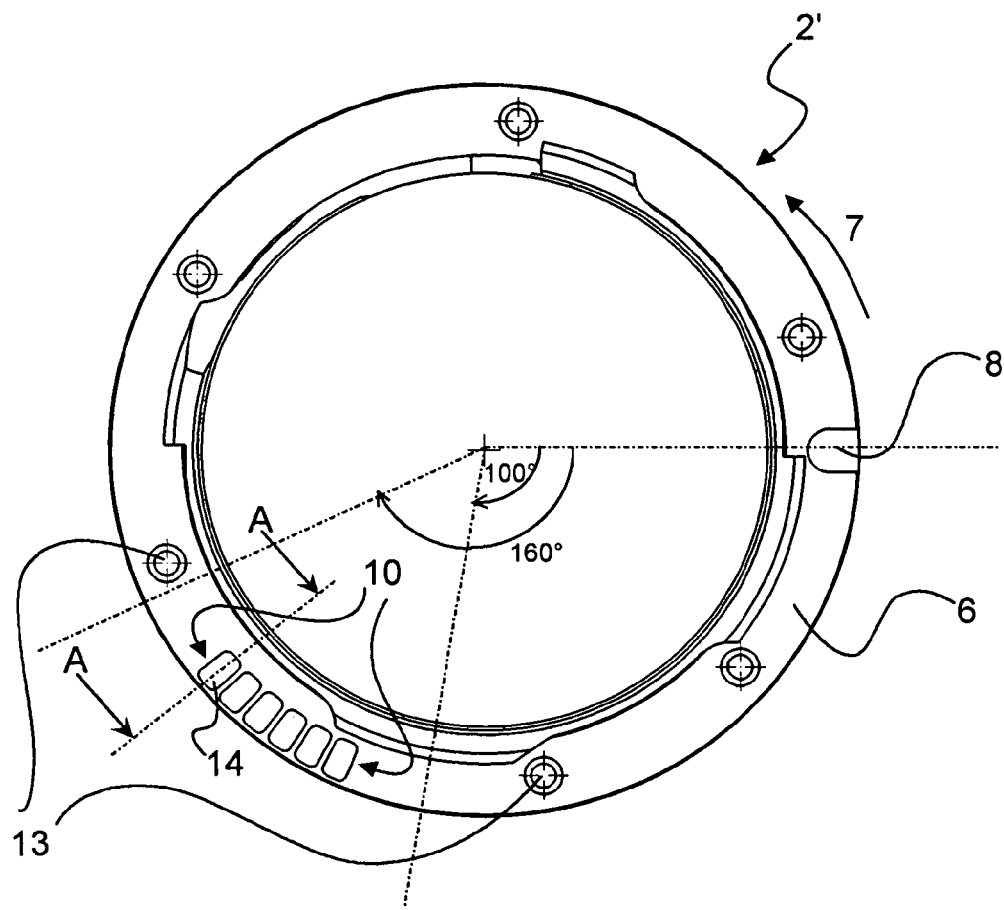
FIG. 2 shows a plan view of a locking device.

FIG. 2 shows a plan view of a locking device 2', which is not fastened to a lens and intended to be used for replacement purposes. This plan view clearly shows the latching depression 8, which is open on one side, in the contact surface 6. Detectable surface areas 10 are located between two threaded holes 13. The surface areas 10 are prepared for producing individual codings, and are in the form of depressions (see also FIG. 3 in this respect). The angle segment between the threaded holes 13 can be used for the addition of the surface areas 10 and is approximately 100° to 160°. A systematic examination of the lenses suitable for retrofitting has shown that this area in particular is free from interruptions by fastening means.

Figure 3:
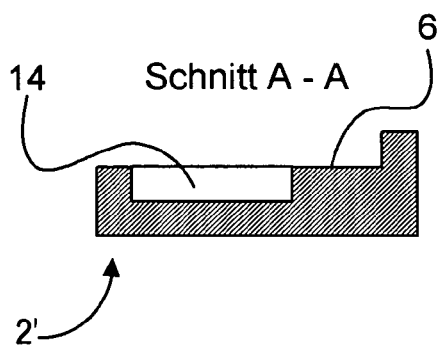
FIG. 3 shows a section view through a surface area which can be detected by optical means.

FIG. 3 shows a section A-A through a single depression 14 in one of the surface areas 10 of the locking device 2' from FIG. 2. The depression 14 is illustrated schematically in relation to the contact surface 6 and can of course also be flatter in reality.

Figure 4:
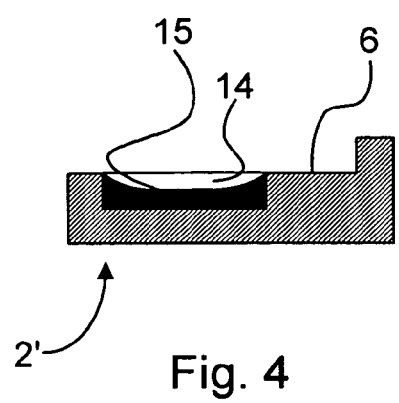
FIG. 4 shows a surface area with a light-absorbing lacquer coating.

As an example of the capability to produce individual coding, the depression 14 (illustrated as section A-A in FIG. 3) in the locking device 2' is coated by a light-absorbing lacquer 15, shown in black in FIG. 4. The lacquer 15 projects in its edge region to the same height as the contact surface 6, but is embedded in the depression 14, well protected from abrasion.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

LIST OF REFERENCE SYMBOLS 1 interchangeable lens
2, 2' locking device
3 lens housing
4 orientation marking
5 bayonet tabs
6 contact surface
7 direction of rotation
8 latching depression
9 fastening screws
10 detectable surface areas
11 light-absorbing surface areas
12 light-reflective surface areas
13 threaded holes
14 depression
15 black lacquer

What is claimed is:

1. Interchangeable lens with a locking device for system camera, comprising an orientation marking for mounting the locking device on the camera at an end of the lens housing facing the camera, a contact surface of the locking device comprising a latching depression at a distance from the orientation marking counter to a direction of rotation of a locking operation, wherein the contact surface comprises at least two surface areas which are situated next to one another in an isolated fashion at a distance from the latching depression counter to the direction of rotation within an angle segment of from 100° to 160°, and which can be individually detected optically; wherein the surface areas are in the form of depressions in the contact surface that are elongated with respect to the radius of the interchangeable lens, and wherein the surface areas comprise a coating comprising a light lacquer layer or a dark lacquer layer.

2. Interchangeable lens according to claim 1, wherein the surface areas are of equal size and wherein distances between adjacent surface areas are equal.

3. Interchangeable lens according to claim 1, wherein light-absorbing surface areas are produced by baking heating by laser engraving, by chemical etching or sand blasting.

4. Interchangeable lens according to claim 1, wherein the depressions are produced by laser engraving or milling and have a light-reflective characteristic or a light-absorbing characteristic.

5. Interchangeable lens according to claim 4, wherein a light-absorbing characteristic of the depressions is produced subsequently by introducing light-absorbing lacquer.

6. Interchangeable lens according to claim 1, wherein the surface areas are situated at a distance from the latching depression counter to the direction of rotation within an angle segment of from 110° to 150°.

* * * * *